United States Patent
Tamersoy et al.

(10) Patent No.: US 9,185,119 B1
(45) Date of Patent: Nov. 10, 2015

(54) SYSTEMS AND METHODS FOR DETECTING MALWARE USING FILE CLUSTERING

(71) Applicant: Symantec Corporation, Mountain View, CA (US)

(72) Inventors: Acar Tamersoy, Atlanta, GA (US); Kevin A. Roundy, El Segundo, CA (US); Daniel Marino, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/273,503

(22) Filed: May 8, 2014

(51) Int. Cl.
*G08B 23/00* (2006.01)
*H04L 29/06* (2006.01)
*G06F 17/30* (2006.01)

(52) U.S. Cl.
CPC .......... *H04L 63/14* (2013.01); *G06F 17/30103* (2013.01); *G06F 17/30115* (2013.01)

(58) Field of Classification Search
CPC .................... G06F 17/30115; G06F 17/30103; H04L 63/14
USPC .......................................................... 726/23
See application file for complete search history.

(56) References Cited

U.S. PATENT DOCUMENTS 8,190,611 B1    5/2012  Nachenberg et al.
8,341,745 B1 *  12/2012 Chau et al. ...................... 726/24
8,650,649 B1 *  2/2014  Chen et al. ...................... 726/24

OTHER PUBLICATIONS

Chau, Duen H., et al., "Polonium: Tera-Scale Graph Mining and Inference for Malware Detection", http://www.cs.cmu.edu/~dchau/polonium_sdm2011.pdf, as accessed Mar. 18, 2014, (2011).
Denis, Frank , "Discovering Malicious Domains Using Co-Occurrences", http://labs.opendns.com/2013/07/24/co-occurrences/?referred=1, as accessed Mar. 18, 2014, OpenDNS Security Labs Blog, (Jul. 24, 2013).
"McAfee Global Threat Intelligence; Comprehensive, cloud-based threat intelligence", http://www.mcafee.com/us/resources/datasheets/ds-global-threat-intelligence.pdf, as accessed Mar. 18, 2014, Data Sheet, McAfee, Inc., (2010).
"McAfee GTI Reputation & Categorization Services", http://www.mcafee.com/us/threat-center/technology/gti-reputation-technologies.aspx, as accessed Mar. 18, 2014, McAfee, Inc., (2003).
"McAfee Global Threat Intelligence File Reputation Service; Best Practices Guide for McAfee VirusScan® Enterprise Software", https://kc.mcafee.com/resources/sites/MCAFEE/content/live/PRODUCT_DOCUMENTATION/24000/PD24043/en_US/48302wp_gti-best-practices_0812_fnl.pdf, as accessed Mar. 18, 2014, McAfee, Inc., (2012).

(Continued)

*Primary Examiner* — Kambiz Zand
*Assistant Examiner* — Aubrey Wyszynski
(74) *Attorney, Agent, or Firm* — ALG Intellectual Property, LLC

(57) ABSTRACT

The disclosed computer-implemented method for detecting malware using file clustering may include (1) identifying a file with an unknown reputation, (2) identifying at least one file with a known reputation that co-occurs with the unknown file, (3) identifying a malware classification assigned to the known file, (4) determining a probability that the unknown file is of the same classification as the known file, and (5) assigning, based on the probability that the unknown file is of the same classification as the known file, the classification of the known file to the unknown file. Various other methods, systems, and computer-readable media are also disclosed.

17 Claims, 7 Drawing Sheets

(56) References Cited

OTHER PUBLICATIONS

"FAQs for Global Threat Intelligence File Reputation", https://kc.mcafee.com/corporate/index?page=content&id=KB53735, as accessed Mar. 18, 2014, Knowledge Center, McAfee, Inc., (2003).
Jeffrey S. Wilhelm, et al; Systems and Methods for Anticipating File-Security Queries; U.S. Appl. No. 14/570,518, filed Dec. 15, 2014.
Christopher Gates, et al; Systems and Methods for Curating File Clusters for Security Analyses; U.S. Appl. No. 14/733,983, filed Jun. 9, 2015.
Kevin Roundy, et al; Systems and Methods for Whitelisting File Clusters in Connection with Trusted Software Packages; U.S. Appl. No. 14/737,528, filed Jun. 12, 2015.
Christopher Gates, et al; Systems and Methods for File Classification; U.S. Appl. No. 14/751,178, filed Jun. 26, 2015.
Karampatziakis, Nikos et al., "Using File Relationships in Malware Classification", http://link.springer.com/chapter/10.1007/978-3-642-37300-8_1, as accessed May 26, 2015, Using File Relationships in Malware Classification, Detection of Intrusions and Malware, and Vulnerability Assessment Lecture Notes in Computer Science, 9th International Conference, DIMVA 2012, vol. 7591, Springer Berlin Heidelberg, Crete, Greece, (Jul. 26-27, 2012).
Ye, Yanfang et al., "Combining File Content and File Relations for Cloud Based Malware Detection", http://users.cis.fiu.edu/~taoli/pub/p222-malware.pdf, as accessed May 26, 2015, KDD'11, ACM, San Diego, California, (Aug. 21-24, 2011).
"Malheur", http://www.mlsec.org/malheur/, as accessed May 26, 2015, (Jan. 4, 2010).
"Application Whitelisting", https://www.bit9.com/solutions/application-whitelisting/, as accessed Mar. 30, 2015, Bit9, (Apr. 29, 2013).
"McAfee Application Control", www.mcafee.com/us/products/application-control.aspx, as accessed Mar. 30, 2015, (Dec. 12, 2010).

* cited by examiner

SYSTEMS AND METHODS FOR DETECTING MALWARE USING FILE CLUSTERING

BACKGROUND

In recent years, malicious programmers have created a variety of sophisticated targeted attacks aimed at high-profile or high-level entities, such as governments, corporations, political organizations, defense contractors, or the like. In many cases, the goal of such targeted attacks is to gain access to highly sensitive or confidential information, such as security credentials, financial information, defense-related information, and/or intellectual property (e.g., source code), and/or to simply disrupt an entity's operations.

Many security software companies attempt to combat targeted attacks by creating and deploying malware signatures (e.g., hash functions that uniquely identify known malware) to their customers on a regular basis. However, a significant number of the above-mentioned attacks involve malware that has been carefully crafted to take advantage of an as-yet-undiscovered vulnerability of a particular application (commonly known as a "zero-day" exploit). As such, these attacks are often difficult for traditional security software to detect and/or neutralize since the exploits in question have yet to be publicly discovered.

In addition to or as an alternative to a signature-based approach, some security software companies utilize a variety of behavior-based heuristics to detect targeted attacks. Unfortunately, a significant number of targeted attacks (e.g., advanced persistent threats) may move at a slow pace such that traditional security software may be unable to distinguish individual malicious behaviors of the targeted attacks from legitimate behaviors, particularly since attacks of this type may involve the use of benign software and/or the actions of authorized users, which are generally not detected either by malware signatures or behavior-based heuristics.

Both the high stakes involved and the changing nature of threats create an increasing need to detect malware as early as possible, before data loss, system compromise, or other damage occurs. Accordingly, the instant disclosure identifies and addresses a need for improved systems and methods for detecting malware.

SUMMARY

As will be described in greater detail below, the instant disclosure describes various systems and methods for using file clustering to detect malware based on an assumption that unknown files that frequently co-occur with malware files are more likely to include malware than files that frequently co-occur with files known to be safe. In one example, a computer-implemented method for performing such a task may include (1) identifying a file with an unknown reputation, (2) identifying at least one file with a known reputation that co-occurs with the unknown file, (3) identifying a malware classification assigned to the known file, (4) determining the probability that the unknown file is of the same classification as the known file, and (5) assigning, based on the probability that the unknown file is of the same classification as the known file, the classification of the known file to the unknown file.

In some examples, identifying the unknown file may include (1) obtaining, from at least one additional client device, information that identifies the unknown file, (2) querying, using the information that identifies the unknown file, a file reputation database, and (3) receiving, in response to querying the file reputation database, an indication that the unknown file's reputation is unknown. In some examples, identifying the classification assigned to the known file may include (1) querying, using information that identifies the known file, a file reputation database and (2) receiving, in response to querying the file reputation database, a reputation for the known file that indicates the known file's trustworthiness.

In some examples, identifying the known file that co-occurs with the unknown file may include (1) identifying a set of client devices on which the known file occurs, (2) identifying a set of client devices on which the unknown file occurs, and (3) comparing the sets of client devices to identify the client devices on which the known file co-occurs with the unknown file. In some examples, determining the probability that the unknown file is of the same classification as the known file may include calculating the Jaccard similarity between the sets of client devices on which the known and unknown files occur by dividing the number of client devices on which the known file co-occurs with the unknown file by the number of client devices on which either the known file or the unknown file occurs. In addition, determining the probability that the unknown file is of the same classification as the known file may include clustering the sets of client devices using at least one hashing function that assigns sets of client devices to clusters according a client device selected from the set of client devices on which the known file or the unknown file occur.

In one embodiment, assigning the classification of the known file to the unknown file based on the probability that the unknown file is of the same classification as the known file may include (1) constructing a bipartite graph including a set of cluster nodes representing each client device cluster and a set of file nodes representing the known file and the unknown file, where cluster nodes are connected through edges to file nodes according to the occurrence of the file corresponding to the file node on the set of client devices represented by the cluster node, and (2) iteratively propagating the classification of the known file to the unknown file according to the probability that the unknown file is of the same classification as the known file.

In one embodiment, iteratively propagating the classification of the known file to the unknown file may include (1) determining a prior for each cluster node in the graph based on an assessment of the probability that the client devices represented by the cluster node contain malware, (2) determining a prior of each file node in the graph based on an assessment of the probability that the file represented by the file node includes malware, (3) determining an edge potential for each edge in the graph based on a relationship between nodes connected by the edge, (4) iteratively propagating the probability of the known file among the nodes by transmitting messages along the edges in the graph, where the message transmitted by the node is generated based on the prior of the node and messages received by the node during any previous iteration, and (5) determining a classification for the unknown file based on the probability associated with the corresponding file node. In one embodiment, iteratively propagating the classification terminates when (1) the probability for the file node representing the unknown file converges within a threshold value and/or (2) a predetermined number of iterations have been completed.

In one embodiment, a system for implementing the above-described method may include several modules stored in memory, such as (1) an identification module that identifies a file with an unknown reputation and at least one file with a known reputation that co-occurs with the unknown file, (2) a reputation module that identifies a classification assigned to the known file, (3) an evaluation module that determines the probability that the unknown file is of the same classification as the known file, (4) an classification module that assigns, based on the probability that the unknown file is of the same classification as the known file, the classification of the known file to the unknown file, and (5) at least one physical processor configured to execute the identification module, the reputation module, the evaluation module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an unknown file with an unknown reputation, (2) identify at least one known file with a known reputation that co-occurs with the unknown file, (3) identify a classification assigned to the known file, (4) determine the probability that the unknown file is of the same classification as the known file, and (5) assign, based on the probability that the unknown file is of the same classification as the known file, the classification of the known file to the unknown file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
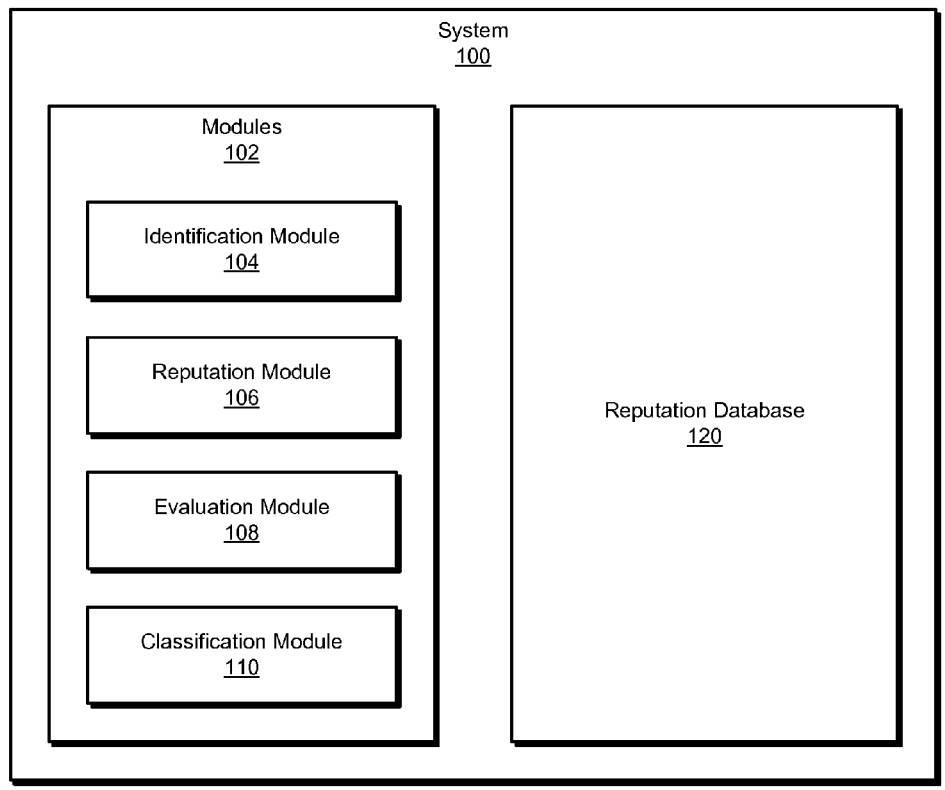
FIG. 1 is a block diagram of an exemplary system for detecting malware using file clustering.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for using file clustering to detect malware. As will be explained in greater detail below, since unknown files that frequently co-occur with malware files are more likely to include malware than files that frequently co-occur with files known to be safe, the systems described herein may classify previously unknown files as safe or malicious with a high degree of certainty and with a limited expenditure of computing resources by (1) determining the probability that a file with an unknown reputation is of the same classification as a known file based at least in part on the number of devices on which the files co-occur and then (2) propagating a malware classification to the unknown file based on the determined probability. By so doing, the systems and methods described herein may identify potential threats before they are encountered elsewhere and before any damage or loss is incurred. In addition, unlike other systems for detecting malware, the systems and methods described herein may identify targeted threats that appear only on computing devices with low infection rates, but that were infected by a particular, known targeted threat in the past. Finally, once a potential threat has been identified, the systems described herein may leverage these underlying file relationships to identify additional vulnerabilities that conventional security software may fail to detect.

Figure 2:
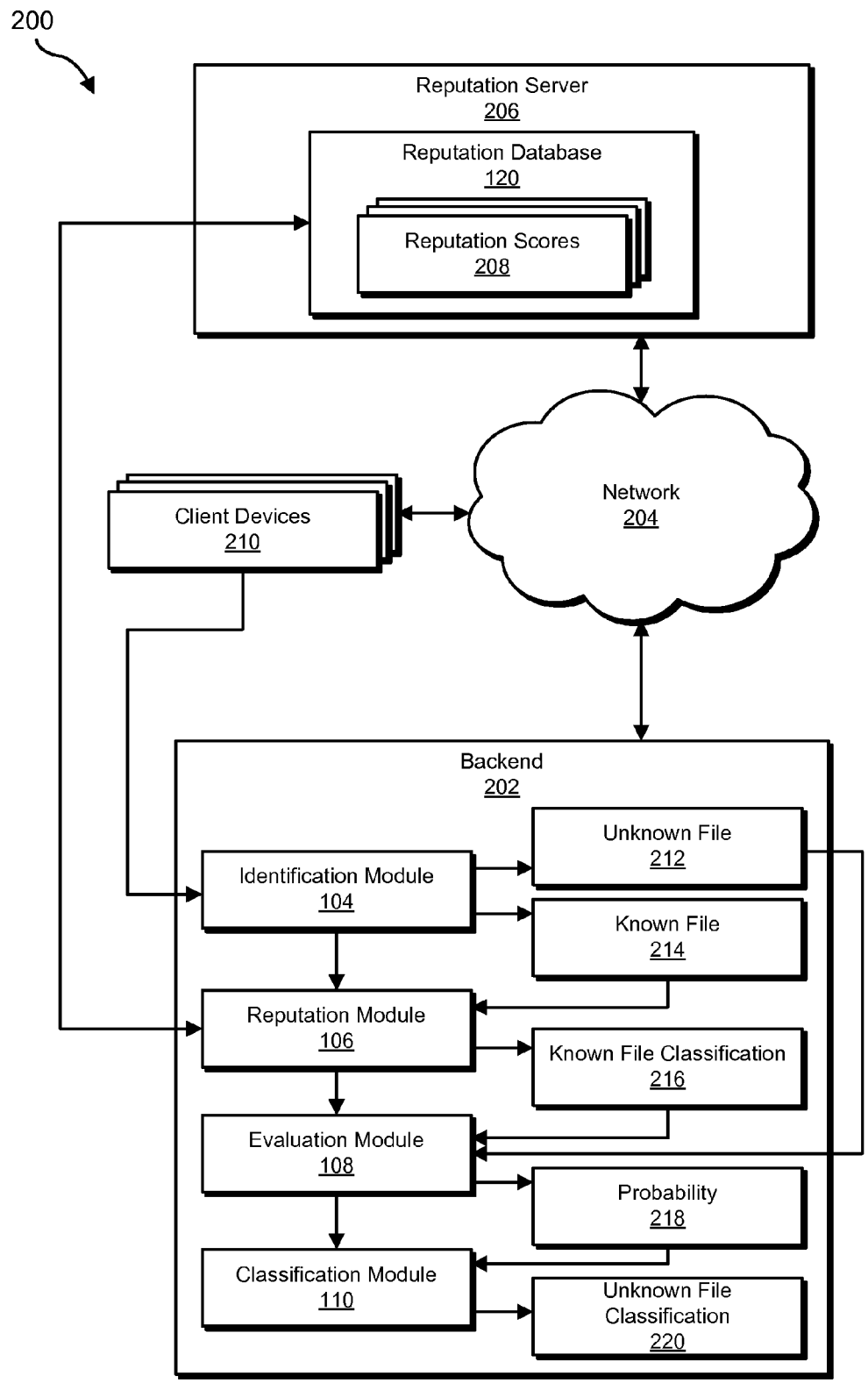
FIG. 2 is a block diagram of an additional exemplary system for detecting malware using file clustering.

The following will provide, with reference to FIGS. 1-2, detailed descriptions of exemplary systems for detecting malware using file clustering. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting malware using file clustering. As illustrated in this figure, exemplary system 100 may include one or more modules 102 for performing one or more tasks. For example, and as will be explained in greater detail below, exemplary system 100 may also include an identification module 104 programmed to identify both an unknown file with an unknown reputation and a file with a known reputation that co-occurs with the unknown file. Exemplary system 100 may additionally include a reputation module 106 programmed to identify a classification (safe or malicious, for example) assigned to the known file.

Exemplary system 100 may additionally include an evaluation module 108 programmed to determine the probability that the unknown file is of the same classification as the known file. Exemplary system 100 may also include a classification module 110 programmed to assign, based on the probability that the unknown file is of the same classification as the known file, the classification of the known file to the unknown file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., backend 202 and/or reputation server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as reputation database 120. In one example, reputation database 120 may be configured to store data (such as reputation scores 208 in FIG. 2) that indicates the trustworthiness of various objects or entities, such as files or file publishers. Reputation database 120 may represent portions of a single database or computing device or a plurality of databases or computing devices. For example, reputation database 120 may represent a portion of backend 202 and/or reputation server 206 in FIG. 2, computing system 610 in FIG. 6, and/or portions of exemplary network architecture 700 in FIG. 7. Alternatively, reputation database 120 in FIG. 1 may represent one or more physically separate devices capable of being accessed by a computing device, such as backend 202 and/or reputation server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a backend 202 in communication with a reputation server 206 via a network 204. In one example, backend 202 may be programmed with one or more of modules 102 and/or may store all or a portion of the data in reputation database 120. Additionally or alternatively, reputation server 206 may be programmed with one or more of modules 102 and/or may store all or a portion of the data in reputation database 120.

In one embodiment, one or more of modules 102 from FIG. 1 may, when executed by at least one processor of backend 202 and/or reputation server 206, enable backend 202 and/or reputation server 206 to detect malware using file clustering. For example, and as will be described in greater detail below, identification module 104 may identify an unknown file 212 with an unknown reputation. Identification module 104 may also identify at least one known file 214 with a known reputation that co-occurs with unknown file 212 on one or more client devices 210. Reputation module 106 may then identify a classification 216 assigned to known file 214. In response, evaluation module 108 may determine a probability 218 that unknown file 212 is of the same classification as known file 214. Classification module 110 may then assign, based on probability 218 that unknown file 212 is of the same classification 216 as known file 214, classification 216 of known file 214 to unknown file 212.

Backend 202 and reputation server 206 generally represent any type or form of computing device that is capable of storing, comparing, and/or providing data. Examples of backend 202 and reputation server 206 include, without limitation, application servers and database servers configured to provide various database services and/or run certain software applications. In some examples, and as illustrated in FIG. 2, backend 202 and reputation server 206 may represent separate and discrete computing devices. In other examples, however, backend 202 and reputation server 206 may represent portions of a single computing device, such as a device operated and maintained by a security software publisher.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between backend 202 and reputation server 206.

Figure 3:
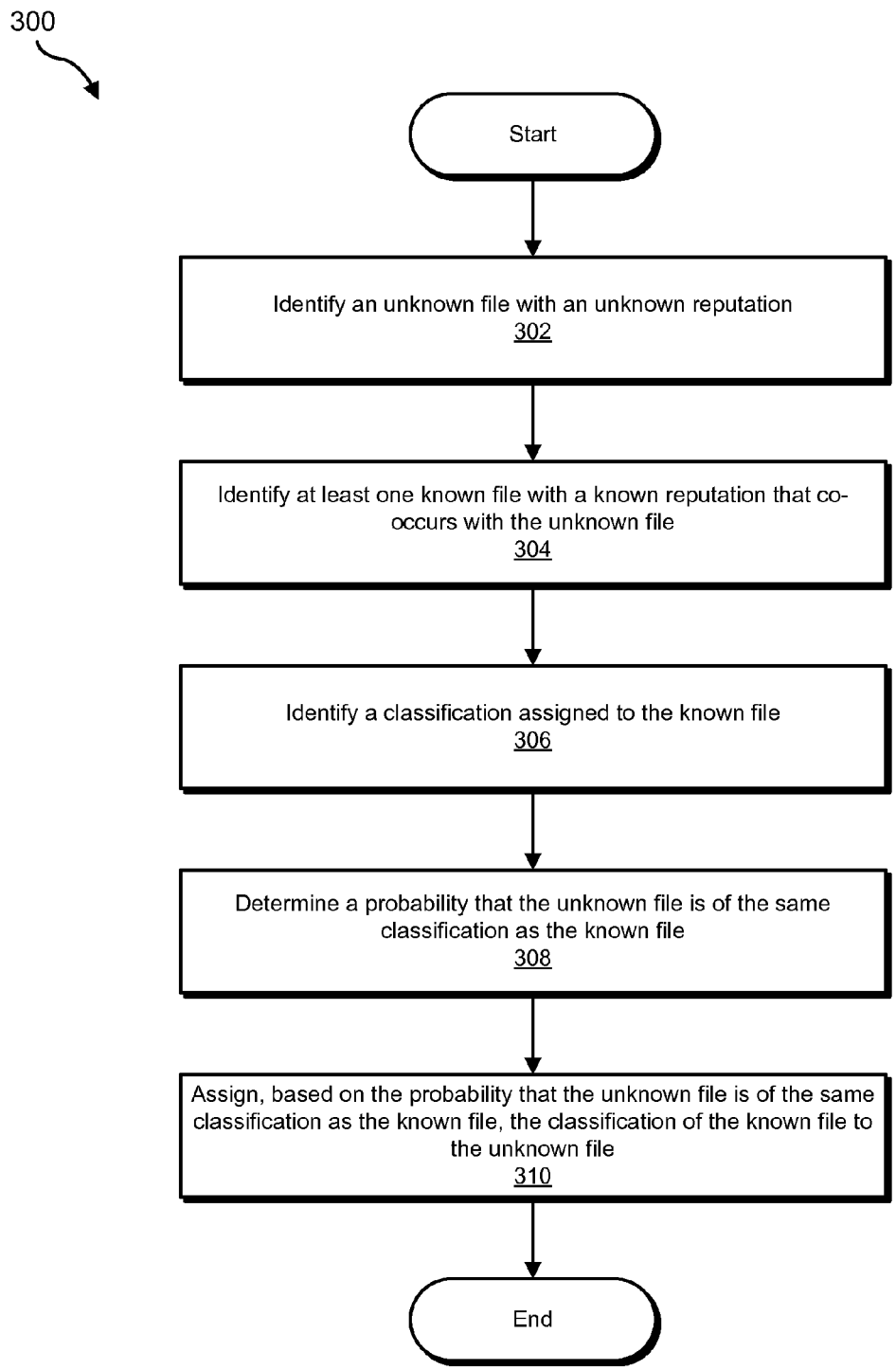
FIG. 3 is a flow diagram of an exemplary method for detecting malware using file clustering.

FIG. 3 is a flow diagram of an exemplary computer-implemented method 300 for detecting malware using file clustering. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify an unknown file with an unknown reputation. For example, at step 302 identification module 104 may identify, as part of backend 202 in FIG. 2, an unknown file 212 with an unknown reputation on one or more of client devices 210.

The term "reputation," as used herein, generally refers to an indication of the trustworthiness, prevalence, prominence, community opinion, and/or reputation of an object or entity, such as a file or publisher. Reputations may be based on a variety of factors, such as the percentage of devices or number of devices on which a file occurs (e.g., the prevalence of a software program in a wide area network, on the Internet, and/or on devices and networks outside a local network, etc.), the length of time a file has been present on one or more devices, an indication of the reliability of a publisher or developer of a file, an indication of the likelihood that a file may contain malware, a community rating of a file, an evaluation of the a by a trusted entity, and/or any other suitable factor. In some examples, the systems described herein may quantify the factors of a file's reputation. In these examples, the systems described here may weight and/or combine two or more factors of a reputation score to yield a single numerical value or reputation score.

Identification module 104 may identify an unknown file in a variety of ways. In some examples, identification module 104 may identify the unknown file by (1) obtaining, from at least one client device, information that identifies the unknown file, (2) querying, using the information that identifies the unknown file, a file reputation database that associates file information with file reputations, and (3) receiving, in response to querying the file reputation database, an indication that the unknown file's reputation is unknown. For example, identification module 104 may receive, from security software installed on one of client devices 210, a request for reputation information for an unknown file 212 encountered by the security software. In this example, the reputation request may include a file hash that uniquely identifies the file in question. Identification module 104 may then query, using the file hash, reputation database 120 to determine the reputation of the file. In this example, reputation database 120 may determine that the reputation of unknown file 212 is unknown (due to, e.g., lacking information sufficient to determine the trustworthiness of the file and/or due to lacking an entry matching the file hash). Upon making this determination, reputation database 120 may send a response to identification module 104 that indicates that the file's reputation is unknown.

In some examples, the systems described herein may continually collect and store information about files from thousands or potentially millions of computing devices within a computing community, such as an enterprise or the user base of a security software publisher. For example, security software installed on computing devices within the user base of a security software publisher (such as client devices 210) may send information that identifies files encountered by these devices when sending reputation queries for these files to backend 202 and/or reputation server 206 (which may, in this example, be maintained and/or operated by the security software publisher). By so doing, the systems described herein may automatically and continually discover new files as these files are encountered by potentially millions of devices during their normal course of operation.

At step 304, the systems described herein may identify at least one known file with a known reputation that co-occurs with the unknown file. For example, at step 304 identification module 104 may, as part of backend 202 in FIG. 2, identify at least one known file 214 with a known reputation that co-occurs with unknown file 212 on one or more of client devices 210.

Identification module 104 may identify a known file that co-occurs with the unknown file in any suitable manner. In some examples, identification module 104 may identify a known file that co-occurs with an unknown file by (1) identifying a set of client devices on which the known file occurs, (2) identifying a set of client devices on which the unknown file occurs, and (3) comparing the sets of client devices to identify the client devices on which the known file co-occurs with the unknown file. For example, and as will be described in greater detail below in connection with steps 308 and 310, identification module 104 may maintain a database that identifies the client devices on which files (such as unknown file 212 and known file 214) have occurred. In this example, identification module 104 may query the database to determine the sets of clients devices on which files 212 and 214 co-occur.

As detailed above, unknown files that frequently co-occur with malware files are more likely to include malware than files that frequently co-occur with files known to be safe. The strength of these co-occurrences relationships may have several underlying explanations. For example, separate malware exploits may be designed to take advantage of the same vulnerability. Specifically, a computing device with a particular operating system version or lacking a particular system patch may be attacked by separate malware instances that install multiple malware files on the same device. In another example, certain organizations or industries may be targeted by hacker organizations, resulting in multiple malware attacks on a set of computing devices used in those organizations or industries. User behavior may also result in multiple malware infections on a set of one or more computing devices. Similarly, users who visit unsafe network sites or neglect security safeguards may be prone to frequent malware infections. As will be described in greater detail below, the systems described herein may leverage this information to identify and classify unknown files that frequently co-occur with known files.

At step 306, one or more of the systems described herein may identify a classification assigned to the known file. For example, at step 306 reputation module 106 may, as part of backend 202 in FIG. 2, identify a classification 216 assigned to known file 214 by querying reputation database 120.

As used herein, the term "classification" generally refers to an assessment of a file's reputation based on a variety of factors, such as a reputation score and/or file prevalence. Examples of file classifications include, without limitation, known good, known bad, and unknown. In some examples, the systems described herein may add additional classifications to indicate, in addition to a file's reputation, additional information, such as the file's prevalence.

Reputation module 106 may identify a classification for a known file in any suitable manner. In some examples, identification module 104 may identify a classification assigned to a known file by (1) querying, using information that identifies the known file, a file reputation database that associates file information with file reputations and (2) receiving, in response to querying the file reputation database, a reputation for the known file that indicates the known file's trustworthiness. For example, identification module 104 may receive a query from one of client devices 210 for a reputation score 208 for known file 214. In this example, the query may include a signature hash that uniquely identifies known file 214. Identification module 104 may then query (using, e.g., the file's hash) reputation database 120 to obtain a reputation for known file 214. In one example, reputation module 106 may assign a classification selected from known good, known bad, and unknown based on a reputation score received from reputation database 120.

At step 308, one or more of the systems described herein may determine the probability that the unknown file is of the same classification as the known file. For example, at step 308 evaluation module 108 may, as part of backend 202 in FIG. 2, determine the probability 218 that unknown file 212 is of the same classification 216 as known file 214.

The systems described herein may determine the probability that the unknown file is of the same classification as the known file in a variety of ways. For example, evaluation module 108 may identify the probability that the unknown file is of the same classification as the known file by calculating the Jaccard similarity between the set of client devices on which the known file co-occurs and the set of client devices on which the unknown file co-occurs.

The term "Jaccard similarity," as used herein, generally refers to a measure of the similarity of two sets. Where the two sets are the sets of client devices on which the known and unknown files occur, the Jaccard similarity represents the strength of the co-occurrence of the two files. In some examples, evaluation module 108 may calculate the Jaccard similarity by dividing the number of client devices on which the known file co-occurs with the unknown file by the number of client devices on which either the known file or the unknown file occurs. In one example, the Jaccard similarity represents the number of client devices in the intersection of the sets of devices on which the known and unknown files occur, divided by the number of client devices in the union of the same sets.

In some examples, evaluation module 108 may identify the probability that the unknown file is of the same classification as the known file by clustering the sets of client devices using at least one hashing function that assigns sets of client devices to clusters according a client device selected from the set of client devices on which the known file and the unknown file occur. Since calculating the Jaccard similarity between the sets of devices on which files co-occur may quickly become computation-intensive as the number of devices and files increases, in some examples evaluation module 108 may estimate the similarity between two sets using hash functions to create clusters of devices containing each of the files.

Figure 4:
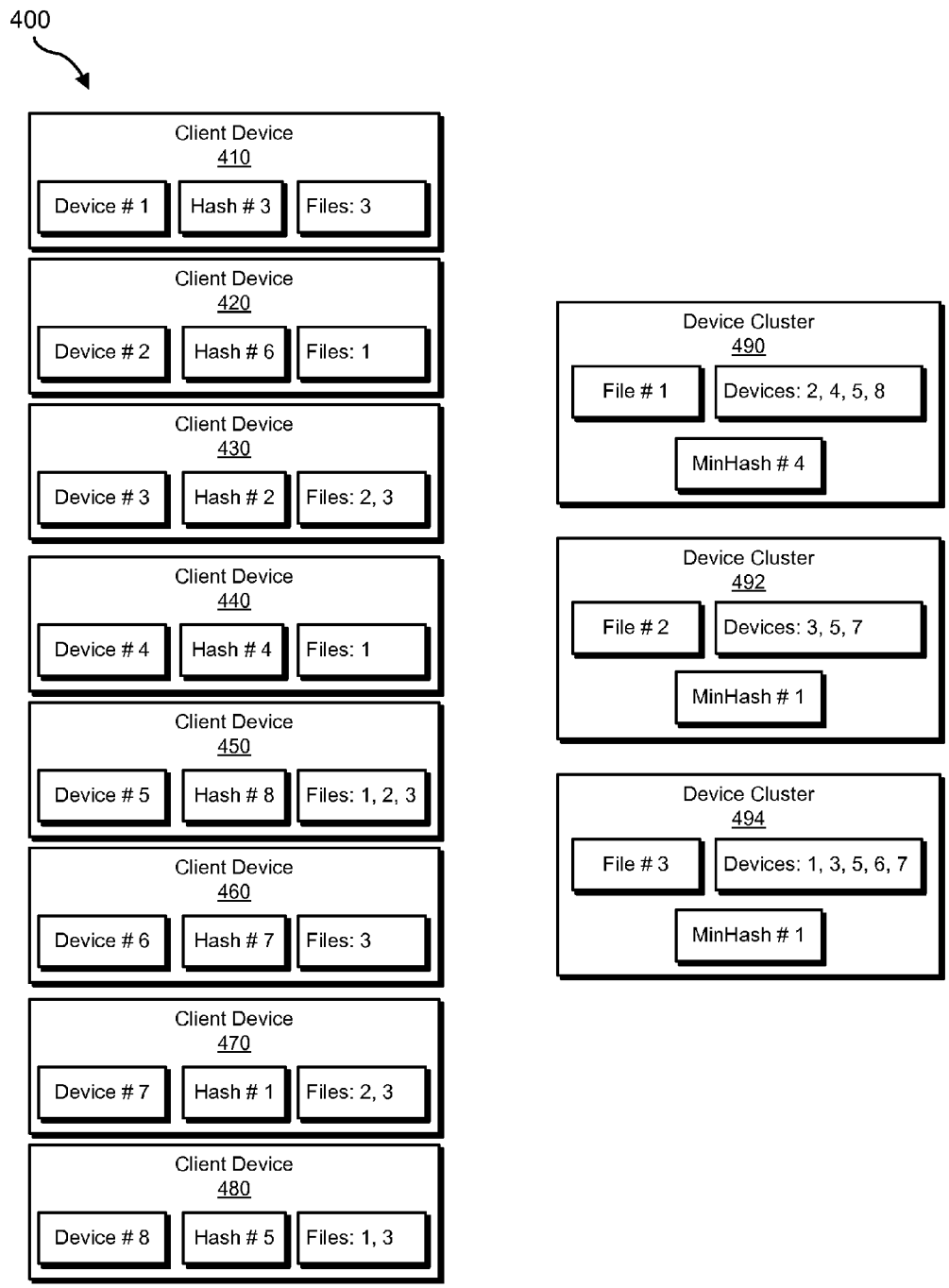
FIG. 4 is a block diagram of an exemplary system for clustering files using a hashing function.

FIG. 4 is a block diagram of an exemplary system 400 for clustering files using a hashing function known as MinHashing. The term "MinHash," as used herein, is a shortened name for an operation known as Minwise Independent Permutation Hashing. As detailed below, the systems described herein may use MinHashing to efficiently estimate the Jaccard similarity of two sets.

As illustrated in FIG. 4, exemplary system 400 includes eight client devices 410-480, with consecutive device numbers 1-8. In this example, each device contains one or more of three files, numbered 1, 2, and 3. A selected hash function randomly maps each of (n) client devices (D) to consecutive ordinal numbers $\{1, \ldots, D(n)\}$. For example, as illustrated in FIG. 4, client device 410 has a device number of 1, a hash value of 3, and contains one file: file 3. Device clusters 490, 492, and 494 are the sets of devices on which each of the three files occur. The similarity between the device clusters may then be estimated by obtaining the MinHash value associated with each cluster. In this figure, the MinHash value for each device cluster is defined as the minimum hash value associated with a device in the device cluster. For example, device cluster 490 includes devices 2, 4, 5, and 8. As such, the minimum hash value associated with a device in the cluster is 4, associated with device 4. Similarly, both device clusters 492 and 494 have MinHash values of 1, since both clusters include device 7.

Even with the small number of files and devices in the example depicted in FIG. 4, the equal MinHash values for device clusters 492 and 494 indicate the similarity of the sets of devices on which files 2 and 3 occur. In this example, the results are similar to the results that would have been obtained by calculating the Jaccard similarity of the sets of devices. The Jaccard similarity between the sets of devices in device clusters 492 and 494 is equal to ⅗, while the Jaccard similarity value for device clusters 490 and 492 is only ⅙, and for device clusters 490 and 494 is only ⅛.

While MinHashing may be used to obtain a rough or initial estimate of the strength of the co-occurrence of two files, the systems and methods described herein may also obtain a more precise measure of co-occurrence strength by applying multiple, related hash functions using a technique known as locality-sensitive hashing (LSH). The term "locality-sensitive hashing," as used herein, generally refers to a technique for high dimensional clustering that uses multiple hash functions to map items into clusters, such that similar items are more likely to be hashed to the same cluster. LSH uses locality-sensitive function families, where each function provides upper and lower bounds on the probability that two similar items will receive the same hash value. The hash functions that randomly map each of (n) client devices (D) to consecutive ordinal numbers $\{1, \ldots, D(n)\}$, as described above, constitute a locality-sensitive function family for the Jaccard similarity. There are locality-sensitive function families defined for other similarity and distance measures, such as the Hamming distance and earth mover's distance (EMD). The results of each hash function may be amplified by combining values returned from multiple functions using logical AND and/or OR. With n random permutation (hash) functions, n MinHash values may be generated and combined in multiple ways. For example, n MinHash values may be partitioned into b bands, each containing r values, such that n=b×r, where a band includes multiple clusters of files, clustered by MinHash value. Combining hash functions in this way may amplify the similarity of the co-occurrence of two files with different MinHash values, resulting in the files being assigned to the same band.

Returning to FIG. 3, at step 310 one or more of the systems described herein may assign, based on the probability that the unknown file is of the same classification as the known file, the classification of the known file to the unknown file. For example, at step 310 classification module 110 may, as part of backend 202 in FIG. 2, assign, based on probability 218 that unknown file 212 is of the same classification as known file 214, classification 216 of known file 214 to unknown file 212.

Classification module 110 may assign the probability of the known file to the unknown file in a variety of ways. In one embodiment, identification module 104 may identify, based on the probability that the unknown file is of the same classification as the known file, the classification of the known file to the unknown file by (1) constructing a bipartite graph that includes a set of cluster nodes representing each client device cluster and a set of file nodes representing the known file and the unknown file, where cluster nodes are connected by edges to file nodes according to the occurrence of the file corresponding to the file node on the set of client devices represented by the cluster node, and (2) iteratively propagating the classification of the known file to the unknown file according to the probability that the unknown file is of the same classification as the known file.

Figure 5:
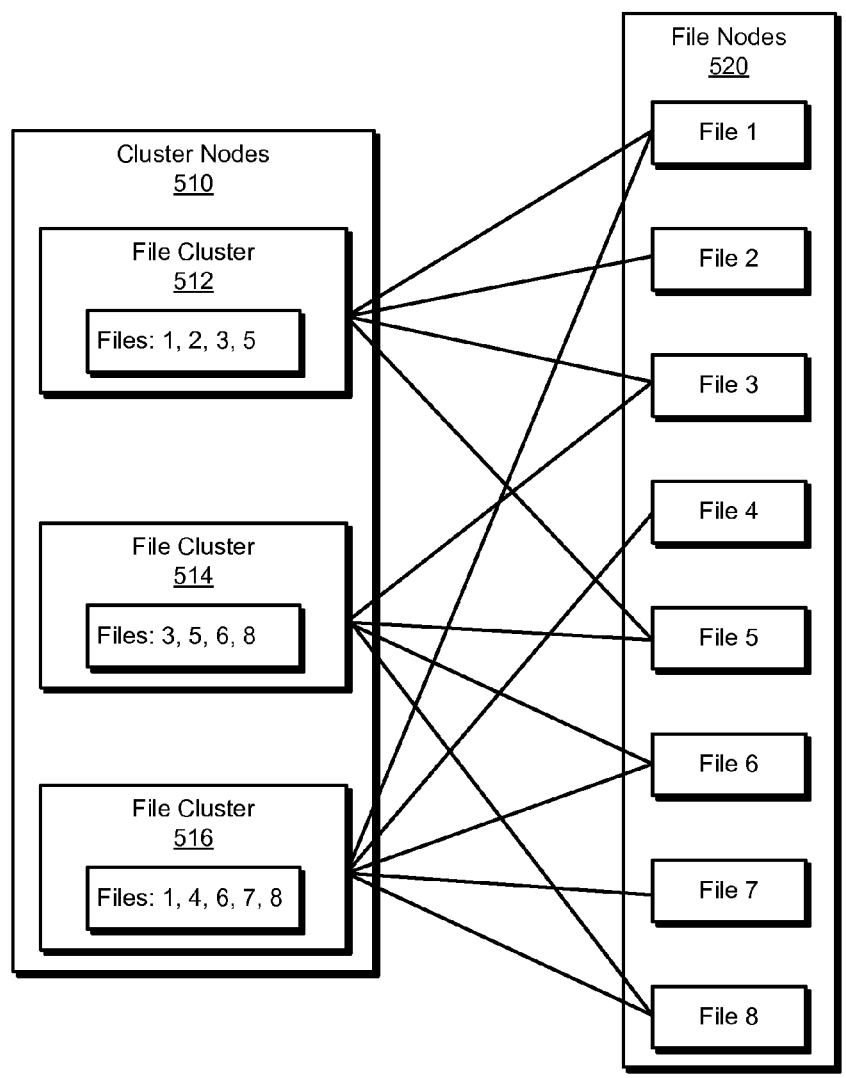
FIG. 5 is a block diagram of an exemplary system for propagating the classification of a known file to an unknown file based on co-occurrence probability.

The term "bipartite graph," as used herein, generally refers to a graph consisting of two disjoint sets of nodes, with edges that connect one member selected from each set. FIG. 5, which is a block diagram of an exemplary system 500 for propagating the classification of a known file to an unknown file based on co-occurrence probability, depicts how a bipartite graph may be used to propagate the probability that a known file includes malware to an unknown file. As illustrated in this figure, exemplary system 500 includes a bipartite graph consisting of a set of cluster nodes 510 and a set of file nodes 520. The set of cluster nodes 510 includes three file clusters, 512, 514, and 516. In this example, the bipartite graph depicted in FIG. 5 may be constructed by creating the set of file nodes 520 representing each file in file clusters 512, 514, and 516, and connecting each file node in the set of file nodes 520 to each file cluster that contains the file node.

In one embodiment, the systems described herein may iteratively propagate the classification of the known file to the unknown file by (1) determining a prior for each cluster node in the graph based on an assessment of a probability that the client devices represented by the cluster node contain malware, (2) determining a prior of each file node in the graph based on an assessment of a probability that the file represented by the file node includes malware, (3) determining an edge potential for each edge in the graph based on a relationship between nodes connected by the edge, (4) iteratively propagating the probability of the known file among the nodes by transmitting messages along the edges in the graph, where the message transmitted by the node is generated based on the prior of the node and messages received by the node during any previous iteration, and (5) determining a classification for the unknown file, based on the probability associated with the corresponding file node.

The term "prior," as used herein, generally refers to data associated with a node in a graph that represents prior knowledge about the node. A prior may include various forms of data, such as a single value, a set of values, or a function. In a procedure operating on a graph, priors may be set to initial values that may be modified as the procedure is executed. The value of a prior at any given time may then be considered to be a state, representing all cumulative knowledge associated with the node, from the initial state, through each step or iteration of the procedure. The term "message," as used herein, generally refers to data passed between adjacent nodes in a graph, along edges. Messages transform prior data associated with the node receiving the message, according to prior data associated with the node sending the message. A message may be transformed as it is sent from a sending node to a receiving node by an edge potential associated with the edge along which the message is sent. The term "edge potential," as used herein, generally refers to a function associated with an edge in a graph that transforms a node's incoming messages to the node's outgoing messages.

For example, classification module 110 may propagate known file classification 216 for known file 214 to unknown file 212 to assign unknown file classification 220. To do so, identification module 104 may construct a bipartite graph similar to exemplary system 500, shown in FIG. 5. Classification module 110 may determine priors for file cluster nodes 512, 514, and 516, based on an assessment of the probability of the file cluster containing malware. Classification module 110 may also determine priors for each of the file nodes included in file nodes 520 based on an assessment of the probability that each file represented by a node includes malware. Classification module 110 may then determine an edge potential for each edge connecting a file node 520 to one of the cluster nodes 510. Classification module 110 may then iteratively propagate the probability associated with the node representing known file 214 to the node representing unknown file 212 by transmitting messages along the edges of the graph based on the prior of the node and messages received during any previous iteration. When classification module 110 determines that the iterative process is completed, classification module 110 may determine a classification 220 for unknown file 212 based on the probability associated with the corresponding file node.

Classification module 110 may set priors for file and file cluster nodes according to prior knowledge of the domain in which the files occur. For example, classification module 110 may set priors for file cluster nodes to 0.5 so that the file clustering has a neutral effect on the propagation of probabilities, and the probability that an unknown file contains malware is calculated based only on the reputation of known files with which it co-occurs. Classification module 110 may set edge potentials to reflect the domain knowledge that an unknown file that occurs with files known to be good is likely to be good as well. For example, classification module 110 may set an edge potential to assign a 0.9 probability that a good file is connected to a good file cluster node and a 0.1 probability of being connected to a bad cluster node (a cluster node containing malware). Conversely, classification module 110 may set an edge potential to assign a 0.9 probability that a bad file is connected to a bad file cluster and a 0.1 probability of being connected to a good cluster node. Once classification module 110 has assigned priors and edge potential functions to the nodes and edges of the bipartite graph, respectively, classification module 110 may propagate probabilities iteratively by passing messages containing a node's probability, along edges to neighboring nodes, with each message being transformed by the edge's associated edge potential as the message is passed. Classification module 110 may then determine when the iteration should terminate, as described below.

In one embodiment, the systems descried herein may terminate the iterative propagation of the classification when (1) the probability for the file node representing the unknown file converges within a threshold value and/or (2) a predetermined number of iterations have been completed. For example, classification module 110 may terminate the iterative propagation of known file classification 216 for the node representing known file 214 to the node representing unknown file 212 when the probability associated with the node representing unknown file 212 converges within a threshold value, indicating a classification 220 for unknown file 212. Although the method described herein is not guaranteed to converge, in practice, convergence may begin within a few iterations. In addition, the systems described herein may set a limit on the number of iterations to be performed to guarantee that iteration terminates. For example, the systems described herein may select a limit of 50 iterations.

As explained above, since unknown files that frequently co-occur with malware files are more likely to include malware than files that frequently co-occur with files known to be safe, the systems described herein may classify previously unknown files as safe or malicious with a high degree of certainty and with a limited expenditure of computing resources by (1) determining the probability that a file with an unknown reputation is of the same classification as a known file based at least in part on the number of devices on which the files co-occur and then (2) propagating a malware classification to the unknown file based on the determined probability. By so doing, the systems and methods described herein may identify potential threats before they are encountered elsewhere and before any damage or loss is incurred. In addition, unlike other systems for detecting malware, the systems and methods described herein may identify targeted threats that appear only on computing devices with low infection rates, but that were infected by a particular, known targeted threat in the past. Finally, once a potential threat has been identified, the systems described herein may leverage these underlying file relationships to identify additional vulnerabilities that conventional security software may fail to detect.

Figure 6:
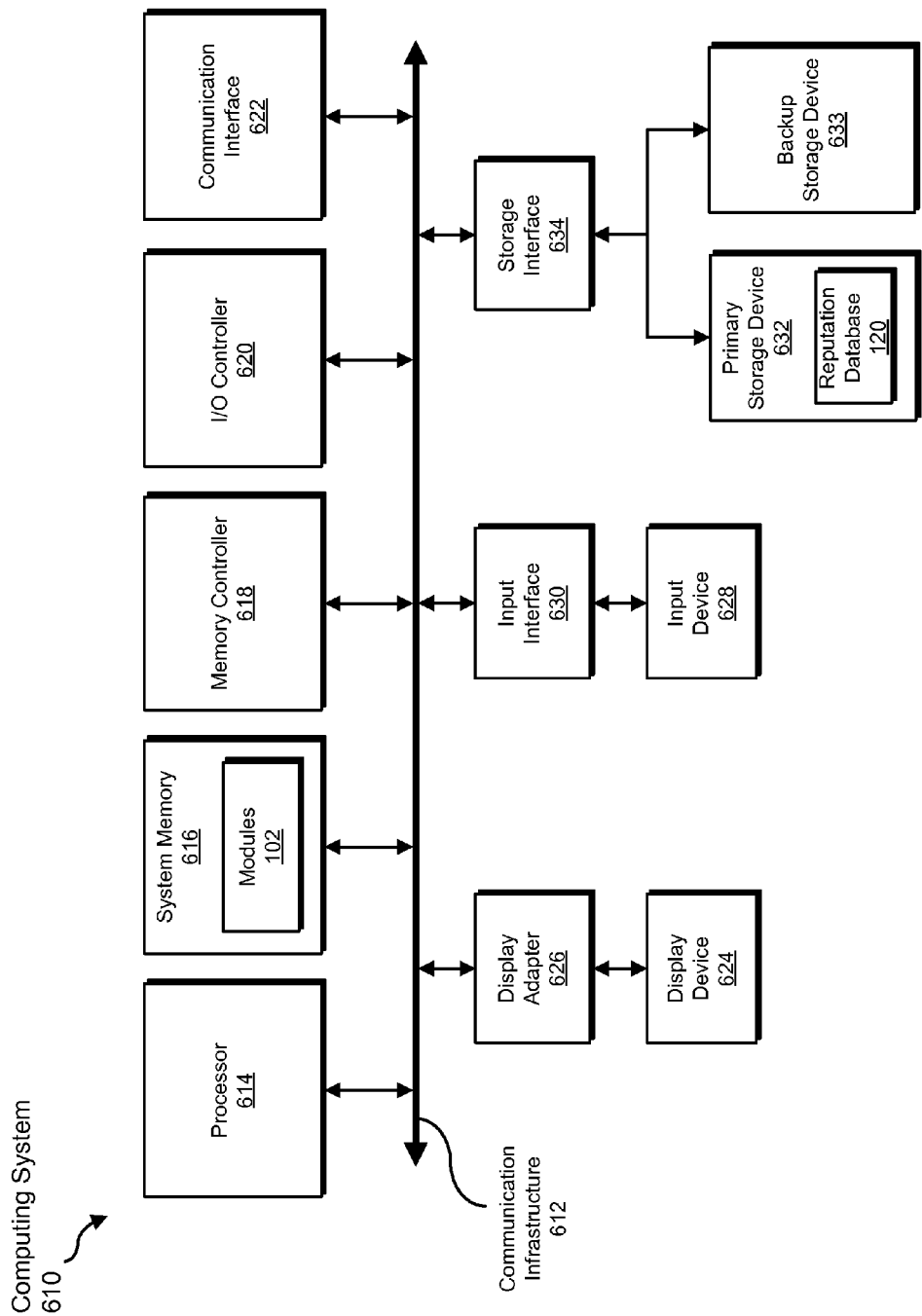
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, reputation database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
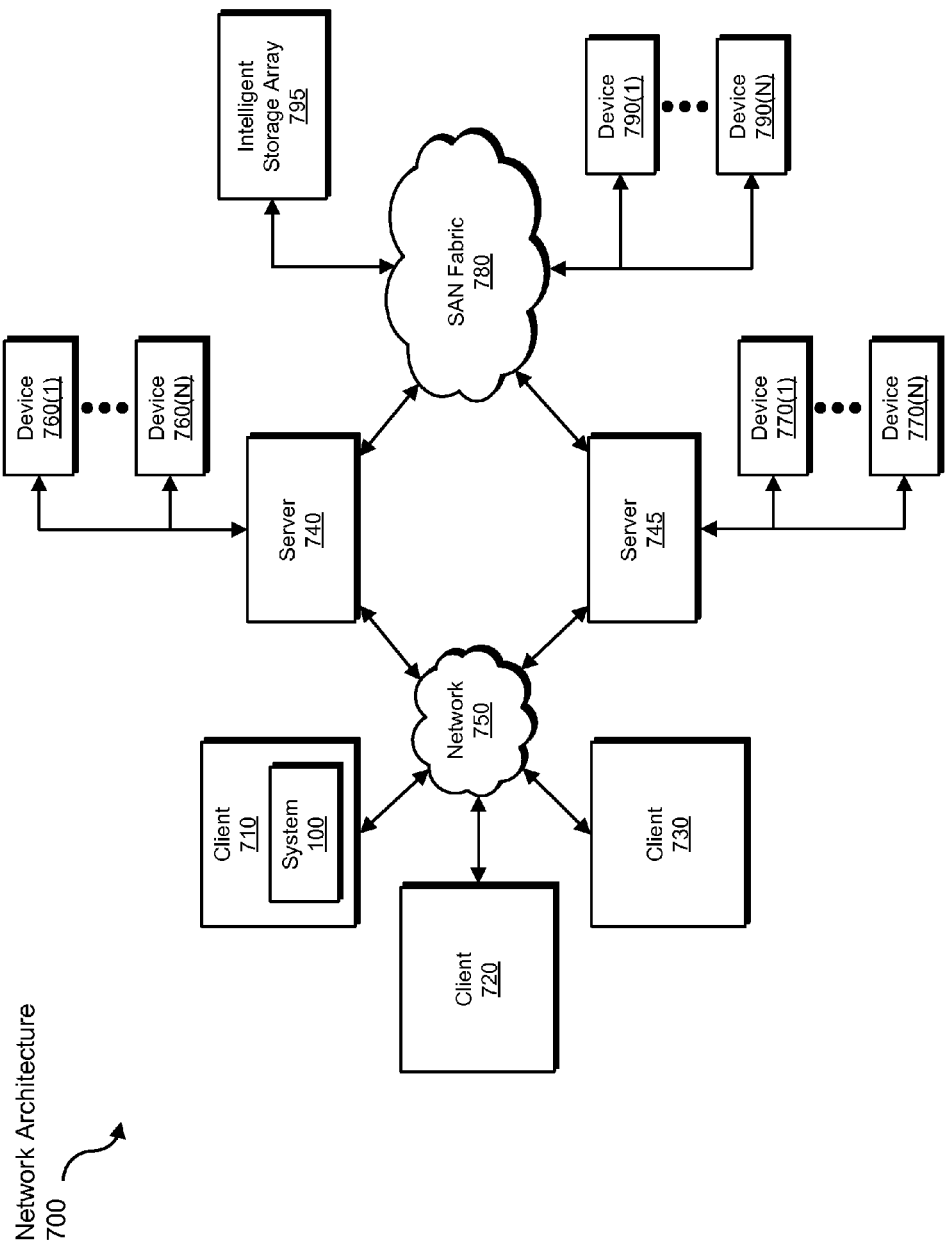
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting malware using file clustering.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, use the result of the transformation to classify one or more files as safe or malicious, and store the result of the transformation to classify the files for later reference. Modules described herein may also transform a physical computing system into a system for detecting malware using file clustering. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malware using file clustering, at least a portion of the method being performed by a computing device comprising at least one processor, the method comprising:
   identifying an unknown file with an unknown reputation;
   identifying at least one known file with a known reputation that co-occurs with the unknown file;
   identifying a classification assigned to the known file;
   determining a probability that the unknown file is of the same classification as the known file;
   assigning, based on the probability that the unknown file is of the same classification as the known file, the classification of the known file to the unknown file wherein identifying the unknown file comprises:
   obtaining, from at least one client device, information that identifies the unknown file;
   querying, using the information that identifies the unknown file, a file reputation database that associates file information with file reputations;
   receiving, in response to querying the file reputation database, an indication that the unknown file's reputation is unknown.

2. The computer-implemented method of claim 1, wherein identifying the classification assigned to the known file comprises:
   querying, using information that identifies the known file, a file reputation database that associates file information with file reputations;
   receiving, in response to querying the file reputation database, a reputation for the known file that indicates the known file's trustworthiness.

3. The computer-implemented method of claim 1, wherein identifying the known file that co-occurs with the unknown file comprises:
   identifying a set of client devices on which the known file occurs;
   identifying a set of client devices on which the unknown file occurs;
   comparing the set of client devices on which the known file occurs with the set of client devices on which the unknown file occurs to identify the client devices on which the known file co-occurs with the unknown file.

4. The computer-implemented method of claim 3, wherein determining the probability that the unknown file is of the same classification as the known file comprises calculating a Jaccard similarity between the set of client devices on which the known file occurs and the set of client devices on which the unknown file occurs by dividing the number of client devices on which the known file co-occurs with the unknown file by the number of client devices on which either the known file or the unknown file occurs.

5. The computer-implemented method of claim 3, wherein determining the probability that the unknown file is of the same classification as the known file comprises clustering the set of client devices on which the known file occurs and the set of client devices on which the unknown file occurs using at least one hashing function that assigns sets of client devices to clusters according a client device selected from the set of client devices on which the known file or the unknown file occur.

6. The computer-implemented method of claim 1, wherein assigning, based on the probability that the unknown file is of the same classification as the known file, the classification of the known file to the unknown file comprises:
   constructing a bipartite graph comprising a set of cluster nodes representing each client device cluster and a set of file nodes representing the known file and the unknown file, wherein cluster nodes are connected through edges to file nodes according to the occurrence of the file corresponding to the file node on the set of client devices represented by the cluster node;
   iteratively propagating the classification of the known file to the unknown file according to the probability that the unknown file is of the same classification as the known file.

7. The computer-implemented method of claim 6, wherein iteratively propagating the classification of the known file to the unknown file comprises:
   determining a prior for each cluster node in the graph based on an assessment of a probability that the client devices represented by the cluster node contain malware;
   determining a prior of each file node in the graph based on an assessment of a probability that the file represented by the file node includes malware;
   determining an edge potential for each edge in the graph based on a relationship between nodes connected by the edge;
   iteratively propagating the probability of the known file among the nodes by transmitting messages along the edges in the graph, wherein a message transmitted by the node is generated based on both the prior of the node and messages received by the node during any previous iteration;
   determining a classification for the unknown file based on the probability associated with the corresponding file node.

8. The computer-implemented method of claim 7, wherein iteratively propagating the classification terminates when at least one of:
   the probability for the file node representing the unknown file converges within a threshold value;
   a predetermined number of iterations have been completed.

9. A system for detecting malware using file clustering, the system comprising:
   an identification module, stored in memory, that:
      identifies an unknown file with an unknown reputation;
      identifies at least one known file with a known reputation that co-occurs with the unknown file;
   a reputation module, stored in memory, that identifies a classification assigned to the known file;
   an evaluation module, stored in memory, that determines a probability that the unknown file is of the same classification as the known file;
   a classification module, stored in memory, that assigns, based on the probability that the unknown file is of the same classification as the known file, the classification of the known file to the unknown file;
   at least one physical processor configured to execute the identification module, the reputation module, the evaluation module, and the classification module;
   wherein the identification module identifies the unknown file by:
   obtaining, from at least one additional client device, information that identifies the unknown file;
   querying, using the information that identifies the unknown file, a file reputation database that associates file information with file reputations;
   receiving, in response to querying the file reputation database, an indication that the unknown file's reputation is unknown.

10. The system of claim 9, wherein the reputation module identifies the classification assigned to the known file by:

querying, using information that identifies the known file, a file reputation database that associates file information with file reputations;

receiving, in response to querying the file reputation database, a reputation for the known file that indicates the known file's trustworthiness.

11. The system of claim 9, wherein the identification module identifies the known file that co-occurs with the unknown file by:

identifying a set of client devices on which the known file occurs;

identifying a set of client devices on which the unknown file occurs;

comparing the set of client devices on which the known file occurs with the set of client devices on which the unknown file occurs to identify the client devices on which the known file co-occurs with the unknown file.

12. The system of claim 11, wherein the evaluation module determines the probability that the unknown file is of the same classification as the known file by calculating a Jaccard similarity between the set of client devices on which the known file occurs and the set of client devices on which the unknown file occurs by dividing the number of client devices on which the known file co-occurs with the unknown file by the number of client devices on which either the known file or the unknown file occurs.

13. The system of claim 11, wherein the evaluation module determines the probability that the unknown file is of the same classification as the known file by clustering the set of client devices on which the known file occurs and the set of client devices on which the unknown file occurs using at least one hashing function that assigns sets of client devices to clusters according to a client device selected from the set of client devices on which the known file or the unknown file occur.

14. The system of claim 9, wherein the classification module assigns, based on the probability that the unknown file is of the same classification as the known file, the classification of the known file to the unknown file by:

constructing a bipartite graph comprising a set of cluster nodes representing each client device cluster and a set of file nodes representing the known file and the unknown file, wherein cluster nodes are connected through edges to file nodes according to the occurrence of the file corresponding to the file node on the set of client devices represented by the cluster node;

iteratively propagating the classification of the known file to the unknown file according to the probability that the unknown file is of the same classification as the known file.

15. The system of claim 14, wherein the classification module iteratively propagates the classification of the known file to the unknown file by:

determining a prior for each cluster node in the graph based on an assessment of a probability that the client devices represented by the cluster node contain malware;

determining a prior of each file node in the graph based on an assessment of a probability that the file represented by the file node includes malware;

determining an edge potential for each edge in the graph based on a relationship between nodes connected by the edge;

iteratively propagating the probability of the known file among the nodes by transmitting messages along the edges in the graph, wherein a message transmitted by the node is generated based on both the prior of the node and messages received by the node during any previous iteration;

determining a classification for the unknown file based on the probability associated with the corresponding file node.

16. The system of claim 14, wherein the classification module terminates iteratively propagating the classification when at least one of:

the probability for the file node representing the unknown file converges within a threshold value;

a predetermined number of iterations have been completed.

17. A non-transitory computer-readable medium comprising one or more computer-readable instructions that, when executed by at least one processor of a computing device, cause the computing device to:

identify an unknown file with an unknown reputation;

identify at least one known file with a known reputation that co-occurs with the unknown file;

identify a classification assigned to the known file;

determine a probability that the unknown file is of the same classification as the known file;

assign, based on the probability that the unknown file is of the same classification as the known file, the classification of the known file to the unknown file wherein the one or more computer-readable instructions cause the computing device to determine the probability that the unknown file is of the same classification as the known file by clustering a set of client devices on which the known file occurs and a set of client devices on which the unknown file occurs using at least one hashing function that assigns sets of client devices to clusters according to a client device selected from the set of client devices on which the known file or the unknown file occur.

* * * * *